(12) United States Patent
Sassi et al.

(10) Patent No.: US 12,429,572 B2
(45) Date of Patent: Sep. 30, 2025

(54) APPARATUS AND METHOD FOR DETERMINING POWER PARAMETERS OF AT LEAST ONE RADIO SYSTEM ARRANGED IN OR ON A VEHICLE

(71) Applicant: VOLKSWAGEN AG, Wolfsburg (DE)

(72) Inventors: Oussama Sassi, Hannover (DE); Mahmud Naseef, Planegg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 542 days.

(21) Appl. No.: 17/632,154

(22) PCT Filed: Jul. 31, 2020

(86) PCT No.: PCT/EP2020/071657
§ 371 (c)(1),
(2) Date: Feb. 1, 2022

(87) PCT Pub. No.: WO2021/019073
PCT Pub. Date: Feb. 4, 2021

(65) Prior Publication Data
US 2022/0276364 A1    Sep. 1, 2022

(30) Foreign Application Priority Data
Aug. 1, 2019  (DE) .......................... 102019211608.6

(51) Int. Cl.
*G01S 13/02* (2006.01)
*B60W 40/12* (2012.01)
*G01S 7/02* (2006.01)

(52) U.S. Cl.
CPC ............. *G01S 13/02* (2013.01); *B60W 40/12* (2013.01); *G01S 7/021* (2013.01);
(Continued)

(58) Field of Classification Search
CPC .. G01S 13/02; G01S 7/021; G01S 2013/0254; B60W 40/12
See application file for complete search history.

(56) References Cited

U.S. PATENT DOCUMENTS 9,660,739 B2    5/2017  Reed
11,088,768 B2   8/2021  Kildal et al.
(Continued)

FOREIGN PATENT DOCUMENTS

CN    205506972 U    8/2016
CN    106471383 A    3/2017
(Continued)

OTHER PUBLICATIONS

Corresponding Chinese Application No. 202080053987.7. Office Action (Feb. 7, 2024).
(Continued)

*Primary Examiner* — William Kelleher
*Assistant Examiner* — Hailey R Le
(74) *Attorney, Agent, or Firm* — Peter Zura; LOZA & LOZA, LLP

(57) ABSTRACT

Technologies and techniques for determining power parameters of at least one radio system arranged in or on a vehicle. A rotatable platform may be provided for receiving and rotating the vehicle, as well as a simulation antenna, a base station emulator connected to the simulation antenna, at least one test antenna, and at least one test device, connected to the at least one test antenna and/or to the simulation antenna, for determining at least one power parameter of the at least one radio system depending on a rotation angle of the vehicle. The simulation antenna includes at least three antennas which, in respect of a rotation axis of the rotatable platform, are arranged at identical angular distances over an entire angular range about the rotatable platform. Aspects
(Continued)

also relate to methods for determining power parameters of at least one radio system arranged in or on a vehicle.

20 Claims, 2 Drawing Sheets

(52) U.S. Cl.
CPC . *B60W 2420/408* (2024.01); *B60W 2510/085* (2013.01); *G01S 2013/0254* (2013.01)

(56) References Cited

U.S. PATENT DOCUMENTS

| | | | |
|---|---|---|---|
| 2010/0225547 A1* | 9/2010 | Lan | H01Q 1/3283 343/861 |
| 2010/0285753 A1* | 11/2010 | Foegelle | H04B 17/21 455/67.12 |
| 2013/0300616 A1 | 11/2013 | Reed | |
| 2014/0087668 A1* | 3/2014 | Mow | H04W 24/08 455/67.14 |
| 2016/0233970 A1 | 8/2016 | Reed | |
| 2018/0062971 A1 | 3/2018 | Kyosti et al. | |
| 2018/0375594 A1* | 12/2018 | Kildal | H01Q 21/061 |
| 2019/0391195 A1* | 12/2019 | Kvarnstrand | H04B 17/15 |
| 2020/0096554 A1* | 3/2020 | Orozco Valdes | G01R 31/2884 |

FOREIGN PATENT DOCUMENTS

| | | |
|---|---|---|
| CN | 108370278 A | 8/2018 |
| EP | 3182619 A1 | 6/2017 |
| WO | 2015113649 A1 | 8/2015 |
| WO | 2015113667 A1 | 8/2015 |
| WO | 2018220077 A1 | 12/2018 |

OTHER PUBLICATIONS

PCT/EP2020/071657. International Search Report (Nov. 3, 2020).
El-Makhour et al. "A Novel Link Budget Approach for the Analysis of Automotive Remote Keyless Entry Systems." 2013 IEEE 78th Vehicular Technology Conference (VTC Fall) pp. 1-5 (Sep. 2-5, 2013).
Corresponding Chinese Application No. 202080053987.7. Office Action (Oct. 23, 2024).
Jinbao et al. "Randect of the Automotive Proving Ground." China Science and Technology Press (p. 85, paragraph 2, p. 89, fifth to last paragraph, and p. 100, paragraph 6). (Jan. 2013).

* cited by examiner

APPARATUS AND METHOD FOR DETERMINING POWER PARAMETERS OF AT LEAST ONE RADIO SYSTEM ARRANGED IN OR ON A VEHICLE

RELATED APPLICATIONS

The present application claims priority to International Patent App. No. PCT/EP2020/071657 to Sassi et al., filed Jul. 31, 2020, which further claims priority to German Pat. App. No. 10 2019 211 608.6 filed Aug. 1, 2019, the contents of each being incorporated by reference in their entirety herein.

TECHNICAL FIELD

Aspects of the present disclosure relate to an apparatus and to a method for determining power parameters of at least one radio system arranged in or on a vehicle.

BACKGROUND

Modern vehicles, in particular motor vehicles, comprise a plurality of radio systems, which are based on various communication methods and utilize various frequencies. The communication methods cover various fields of application, such as mobile communication services (2G, 3G, 4G, 5G, and the like), WLAN, Bluetooth, NFC, broadcasting systems (DVB-T/T2, ATSC 3.0), navigation systems (GPS, Galileo, and the like), radio (AM, FM, DAB, and the like) and security systems (eCall, C-V2X, 802.11p and the like). When using these radio systems in a vehicle, it must be ensured that power parameters and electromagnetic compatibility of the radio systems satisfy statutory requirements. Directive RED 2014/53/EU of the European Union shall be mentioned here by way of example. The radio systems operating according to the various communication methods are tested and checked according to the respective associated standards. In light of the complexity and multifaceted feature options of today's vehicles, an efficient metrological validation of the power parameters and of the electromagnetic compatibility represents a major challenge. In particular, the power parameters and the electromagnetic compatibility are usually determined at the component level, and not for an installed state in the vehicle.

An apparatus for measuring over-the-air (OTA) wireless communication performance in a motor vehicle application of an apparatus under test (DUT) which is arranged at or in a vehicle is known from EP 3 182 619 A1. The apparatus comprises a chamber in which an internal volume is defined, such as an EMC chamber or a semi-anechoic chamber. Furthermore, a rotatable platform for supporting the vehicle is provided, which encloses the internal volume together with at least one chamber antenna. Furthermore, a communication system test instrument for measuring the transmission between the apparatus under test and the chamber antenna is provided. The chamber antenna is an array antenna, comprising a horizontal linear array of antenna elements, wherein the chamber antenna preferably provides a plane wave in the near field where the vehicle is located. The array can furthermore comprise multiple horizontal linear arrays overlying each other in the vertical direction. The array antenna can furthermore comprise a reflector, wherein the reflector is straight in a horizontal direction and arranged in a parabolic curve/an arc in a vertical direction, the horizontal linear array being arranged along the focal line of the reflector.

BRIEF SUMMARY

Aspects of the present disclosure are directed to an apparatus and a method for determining power parameters of at least one radio system arranged in or on a vehicle.

Certain aspects of the present invention are described in the independent claims, below. Advantageous embodiments of the invention will be apparent from the dependent claims.

In some examples, an apparatus is disclosed for determining power parameters of at least one radio system arranged in or on a vehicle is created, comprising a rotatable platform for receiving and rotating the vehicle, a simulation antenna, a base station emulator connected to the simulation antenna, at least one testing antenna, and at least one testing unit, connected to the at least one testing antenna and/or to the simulation antenna, for determining at least one power parameter of the at least one radio system as a function of a rotation angle of the vehicle, wherein the simulation antenna comprise at least three antennas that, with respect to a rotation axis of the rotatable platform, are arranged at identical angular separations over an entire angular range about the rotatable platform.

In some examples, a method is disclosed for determining power parameters of at least one radio system arranged in or on a vehicle, wherein a base station is simulated by way of a base station emulator and a simulation antenna, wherein the simulation antenna comprises at least three antennas, and wherein electromagnetic radiation is emitted and received at angular positions by way of the at least three antennas that, with respect to a rotation axis of a rotatable platform, are arranged at identical angular separations over an entire angular range about the rotatable platform, wherein the vehicle is arranged on the rotatable platform and rotated, and wherein at least one power parameter of the at least one radio system is determined by way of at least one testing unit connected to at least one testing antenna and/or to the simulation antenna as a function of a rotation angle of the vehicle.

Features regarding the design of the method will be apparent from the description of designs of the apparatus. The advantages of the method are in each case the same as with the designs of the apparatus.

BRIEF DESCRIPTION OF THE DRAWINGS

Aspects of the present disclosure are described in more detail hereafter based on preferred exemplary embodiments with reference to the figures. In the drawings.

DETAILED DESCRIPTION

Figure 1:
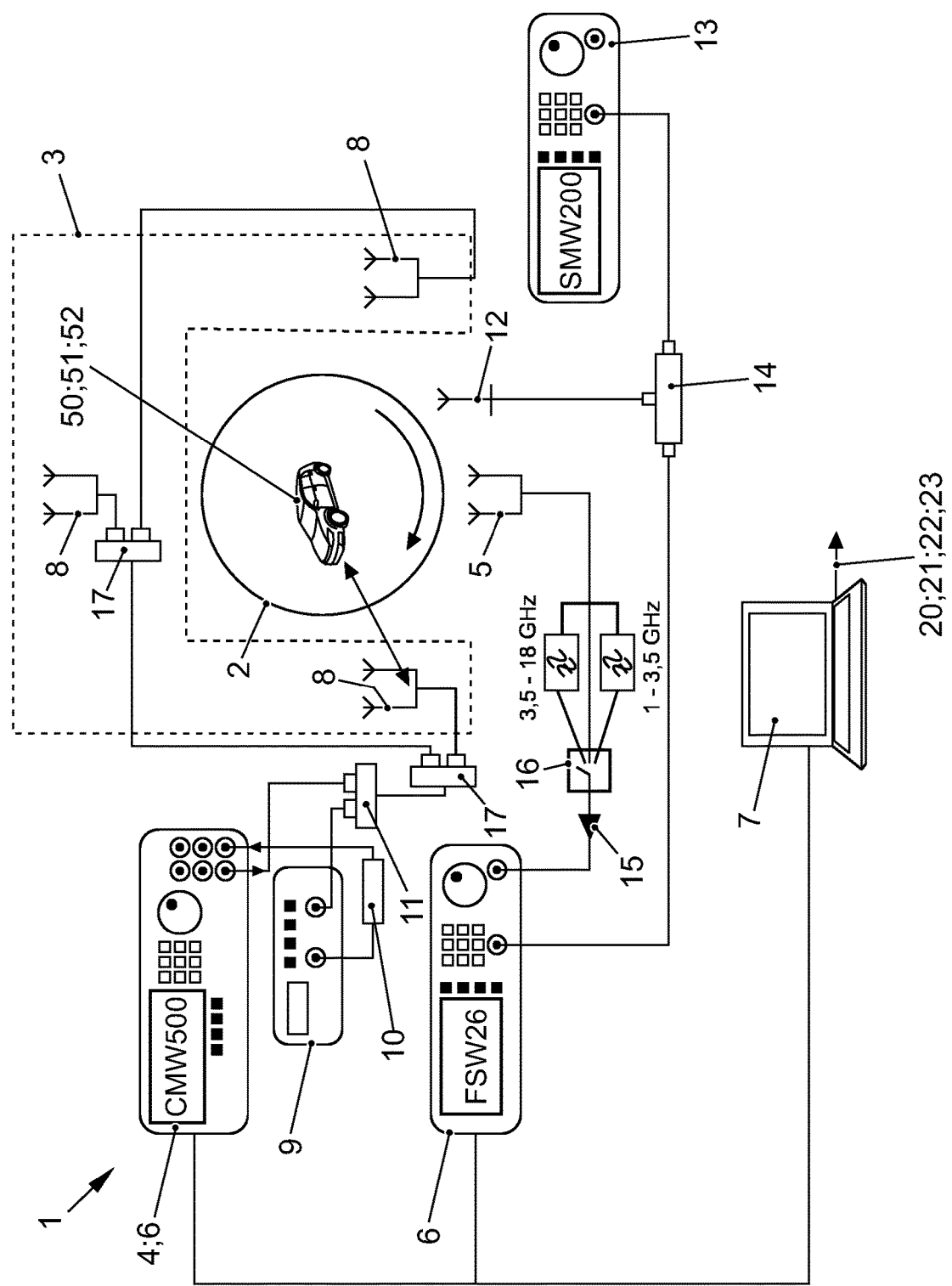
FIG. 1 shows a schematic representation of an embodiment of the apparatus for determining power parameters of at least one radio system arranged in or on a vehicle under some aspects of the present disclosure.

The apparatus and the method described herein allow power parameters of at least one radio system to be determined as a function of a rotation angle of the rotatable platform or a rotation angle of a vehicle rotated on this rotatable platform. For this purpose, at least one base station is simulated by way of a base station emulator. The base station emulator may communicate with the at least one radio system of the vehicle to be tested and, for this purpose, emulates regular communication according to a communication method that is used by the at least one radio system to be tested. The base station emulator is connected to a simulation antenna. According to some aspects, the simulation antenna may include at least three antennas that, with respect to a rotation axis of the rotatable platform, are arranged at identical angular separations over an entire angular range about the rotatable platform. In this way, shading, for example by body parts of the vehicle, can be avoided, and communication between the tested radio system and the base station emulator can be maintained at any rotation angle. The at least one power parameter may be determined by way of at least one testing unit as a function of a rotation angle of the rotatable platform or of the vehicle rotated on the rotatable platform. The testing unit may be connected to a testing antenna, which is arranged in a known position at the rotatable platform and detects electromagnetic energy radiated by the radio system in the direction of this position. As an alternative or in addition, the at least one testing unit can also be connected to the simulation antenna. The apparatus makes it possible to determine in particular multiple power parameters simultaneously. In particular, it is possible to check whether the power parameters determined for the radio system comply with statutory and/or other requirements.

One advantage of the apparatus and of the method is that, due to the at least three antennas of the simulation antenna which are evenly distributed over the entire angular range, communication between the base station emulator and the at least one radio system of the vehicle can be maintained or emulated at all times, even when the vehicle is arbitrarily rotated, since communication can always take place in all directions.

Another advantage is that multiple power parameters can be determined in an efficient manner in a single measuring pass. This saves time and cost.

In some examples, a radio system may be configured to operate according to a certain communication method or a certain communication protocol or standard. A radio system operates according to one of the following methods, for example: mobile radio communication according to different methods/standards (2G, 3G, 4G, 5G, and the like), WLAN, Bluetooth, NFC, broadcasting system according to different methods/standards (DVB-T/T2, ATSC 3.0), navigation systems according to different methods/standards (GPS, Galileo, and the like), radio according to different methods/standards (AM, FM, DAB, and the like) and security systems according to different methods/standards (eCall, C-V2X, 802.11p and the like).

In some examples, a vehicle may be configured as a motor vehicle. However, the vehicle can also be another land vehicle or a watercraft, an aircraft or a rail vehicle comprising at least one radio system.

In some examples, parts of the apparatus, such as the base station emulator and/or the at least one testing unit, may be logically and/or physically combined. Furthermore, it may also be provided that one or more of the power parameters are determined by one testing unit, while another power parameter is or other power parameters are determined by another testing unit.

The covered frequency ranges in which at least some of the power parameters are determined encompass, for example, a frequency range of several MHz to several GHz, in particular from 1 to 18 GHz.

The simulation antenna and the testing antennas may be selected as a function of the respective required frequency ranges. It may also be provided in the process that antenna arrays are used.

The apparatus and a flow of the method may be configured to be controlled by a control unit. The control unit can be designed as a combination of hardware and software, for example as program code that is executed on a microcontroller or microprocessor.

Processes disclosed herein may be carried out in a testing chamber that is designed as an anechoic chamber. The apparatus may therefore be at least partially arranged in a testing chamber or comprises this testing chamber.

In some examples, at least one testing unit may be designed to determine at least one of the following power parameters of the radio system: power spectral density, RF output power, sensitivity, spurious emission, radiated emission and/or intermodulation. The power spectral density is a power, based on the frequency, of the electromagnetic signal in an infinitesimal frequency band or in a wavelength range. Based on the power spectral density, it is in particular possible to check whether a signal is exclusively in a predefined frequency range. The RF output power (also referred to as transmission power) is a power of the radio system in the motor vehicle. Based on the RF output power, it is in particular possible to check whether a maximum power is not exceeded. The sensitivity is a lower limit up to which a radio system can detect an electromagnetic signal. Spurious emission denotes undesirable signals generated in the radio system at frequencies that do not correspond to the intended frequencies. Based on the determined spurious emission, it is in particular possible to check whether the radio system only emits at the predefined frequencies. Spurious emission relates in particular to an antenna of the radio system. Radiated emission, in principle, denotes the same as spurious emission, but also takes electromagnetic radiation radiated by other components of the radio system into consideration. Intermodulation denotes signals at frequencies that are generated by two or more signals at different frequencies when these signals are processed by a non-linear system. It is in particular provided that multiple, or even all, of these power parameters are determined.

In some examples, the apparatus may include at least one jamming antenna connected to the at least one testing unit, wherein the at least one testing unit is furthermore designed to check electromagnetic compatibility of the at least one radio system, using the at least one jamming antenna. In this way, an electromagnetic compatibility of the at least one radio system can additionally be checked within the scope of the same measuring pass. In this way, time and costs can be saved. Checking the electromagnetic compatibility in particular encompasses a check as to whether the at least one radio system is blocked in terms of the communication by another radio system (blocking), and vice versa. The check furthermore may include whether the at least one radio system and another radio system can coexist (coexistence) with respect to radiated electromagnetic radiation and frequencies used. Put simply, it is checked whether the radio system can be operated concurrently with other radio systems, without limitations of a functionality occurring for the radio systems. For example, it is checked whether a radio system in the vehicle for mobile radio communication (such as 4G) can be operated concurrently with a radio system for WLAN without limitations.

In some examples, he at least one testing unit may be configured to check a functioning of antenna diversity of the at least one radio system. In this way, antenna diversity of the at least one radio system can additionally be checked within the scope of the same measuring pass. In this way, time and costs can be saved. In modern applications in communication technology, multiple antennas are increasingly used on the transmitter side and on the receiver side for the operation of the radio systems. The antenna diversity that is achieved can reduced disrupting interferences, in particular in mobile applications. As a result, the functioning of this antenna diversity of the radio system is checked. For this purpose, it is checked whether communication with the tested radio system of the motor vehicle is possible at all times under predefined conditions. In particular, communication between the base station emulator and the tested radio system must not break down at any time, in particular not during a rotation of the vehicle on the platform.

In some examples, the base station emulator and the at least one testing unit may be configured to determine power parameters of at least one further radio system arranged in or on the vehicle and/or to check a functioning of an antenna diversity of the at least one further radio system and/or electromagnetic compatibility of the at least one further radio system. In particular, it may be provided that, when several of these radio systems are present in the vehicle (such as mobile radio communication according to 4G and WLAN), these are first tested individually, and thereafter together, that is, during concurrent operation, by way of the apparatus and the method. In this way, all radio systems present in the vehicle can be tested individually and in combination or in cooperation within the scope of the same measuring pass. The determination of the power parameters and the checks can thus be carried out in a time-saving and cost-saving manner.

FIG. 1 shows a schematic representation of an embodiment of the apparatus 1 for determining power parameters 20 of at least one radio system 51 arranged in or on a vehicle 50. The apparatus 1 comprises a rotatable platform 2 for receiving and rotating the vehicle 50, a simulation antenna 3, a base station emulator 4, a testing antenna 5, and a testing unit 6. The testing antenna 5 is connected via an amplifier 15 and a switch 16 for selecting a measuring area to the testing unit 6. The apparatus 1 furthermore comprises a control unit 7, which controls a flow of the method by providing control signals for the rotatable platform 2, the base station emulator 4 and the testing unit 6. The apparatus 1 moreover comprises a signal amplifier 9, an attenuator 10, and a combiner 11 (also referred to as a joiner).

In this example, the simulation antenna 3 includes three antennas 8. The antennas 8 are connected via lossless duplexers 17 to the combiner 11. However, it may be provided that the simulation antenna 3 comprises more than three antennas 8. With respect to a rotation axis of the rotatable platform 2, the three antennas 8 are arranged at identical angular separations over an entire angular range about the rotatable platform 2 and can, for example, be designed as horn antennas. In the case of three antennas 8, the angular separation with respect to one another is 120° in each case.

In this example, the base station emulator 4 is illustrated as a type R&S CMW500 from Rohde & Schwarz. Similarly, the testing unit 6 is illustrated as an R&S FSW26 from Rohde & Schwarz. In the illustrated example, some of the functionality of the testing unit 6 may be taken over by the R&S CMW500.

In some examples, processes of the present disclosure may be carried out in a testing chamber (not shown) that is designed as an anechoic chamber, for example. The apparatus 1 is therefore at least partially arranged in a testing chamber or comprises this testing chamber.

So as to determine the power parameters 20, a wireless communication link is established and maintained between the base station emulator 4 and the radio system 51 of the vehicle 50 to be tested. The vehicle 50 is subsequently moved into an angular position by way of the rotatable platform 2. For this angular position, the power parameters 20 are determined.

Using the testing unit 6, for example, the following power parameters 20 are determined: power spectral density, RF output power, sensitivity, spurious emission, radiated emission and/or intermodulation. The power spectral density, the RF output power and the sensitivity are determined by the R&S CMW500. The spurious emission, the radiated emission and the intermodulation are determined by the R&S FSW26.

Thereafter, the vehicle 50 is rotated into a further angular position, and the power parameters 20 are determined for this subsequent angular position. This is repeated for a suitable number of angular positions, so that the vehicle 50 in the end has carried out a full revolution on the rotatable platform 2. As a result, the power parameters 20 are provided as a function of the angular position. The determined power parameters 20 are output by the control unit 7, for example.

It may furthermore be provided that the control unit 7 compares the power parameters 20 to predefined values and, in this way, checks whether the predefined values are reached or adhered to.

In some examples, the apparatus 1 may include a jamming antenna 12. The jamming antenna 12 is connected via an amplifier apparatus 14 to the testing unit 6 and a further testing unit 13. The further testing unit 13 is of the type R&S SMW200 from Rohde & Schwarz, for example. The further testing unit 13 may be configured so as to additionally check electromagnetic compatibility of the radio system 51 in the vehicle 50. The checking of the electromagnetic compatibility takes place separately from the determination of the power parameters 20, that is, in particular subsequent to the determination of the power parameters 20. Within the scope of the check, in particular a blocking and a coexistence of the radio system 51 with another radio system is checked. After the check, the control unit 7 outputs a compatibility check signal 21, for example.

In some examples, the testing unit 6 may be configured to check a functioning of an antenna diversity of the radio system 51. For this purpose, it is checked whether communication between the base station emulator 6 and the radio system 51 can be maintained without limitations for all rotation angles. After the check, the control unit 7 outputs an antenna diversity check signal 22, for example.

In some examples, the base station emulator 4 and the testing unit 6 or the further testing unit 13 may be configured to determine power parameters 20 of at least one further radio system 52 arranged in or on the vehicle 50 and/or to check a functioning of an antenna diversity of the at least one further radio system 52 and/or an electromagnetic compatibility of the at least one further radio system 52. In this way, all radio systems 51, 52 that are installed in the vehicle 50 are tested.

In some examples, the control unit 7 may prepare and issue a report 23 that the method has been carried out for all radio systems 51, 52. The report 23 assesses or evaluates the determined power parameters 20, the antenna diversity, and the electromagnetic compatibility, in particular based on statutory and possibly further requirements.

Figure 2:
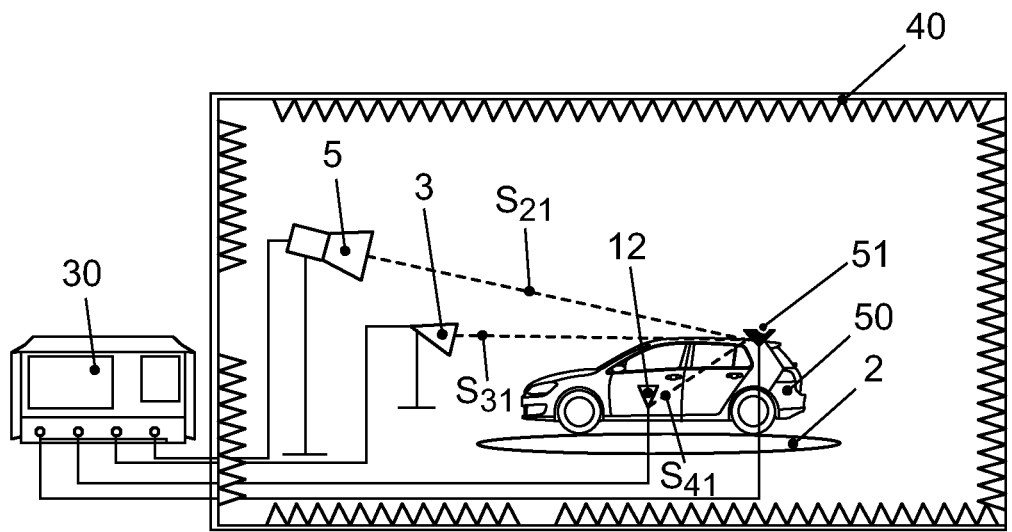
FIG. 2 shows a schematic representation to illustrate a calibration carried out before the method is carried out under some aspects of the present disclosure.

In some examples, before the power parameters are determined, the apparatus 1 is calibrated. FIG. 2 shows a schematic representation to illustrate a calibration before the method is carried out. The calibration takes place in particular in a testing chamber 40. For the calibration, S-parameters of the particular transmission paths are determined by way of a network analyzer 30. $S_{21}$ denotes a transmission path from the radio system 51 of the vehicle 50 via the testing antenna 5. $S_{31}$ denotes a transmission path from the radio system 51 of the vehicle 50 via the simulation antenna 3. $S_{41}$ denotes a transmission path between the radio system 51 via the jamming antenna 12.

The frequency-dependent $S_{x1}$ parameters are then calculated according to the following equation:

$$S_{21}(f) = G_{TX}(f) + G_{RX}(f) - C_{TX}(f) - C_{RX}(f) + G_{amp} - PL(f)|$$

where G_TX is frequency-dependent gain of a transmitting antenna, G_RX is frequency-dependent gain of a receiving antenna, C_TX is frequency-dependent attenuation of a cable to the transmitting antenna, C_RX is frequency-dependent attenuation of a cable to the receiving antenna, G_amp is gain of a possibly utilized amplifier, and PL is free space path loss.

The determined $S_{x1}$ parameters are subsequently taken into consideration during the determination of the power parameters by using these to calibrate the base station emulator and the at least one testing unit.

Figure 3:
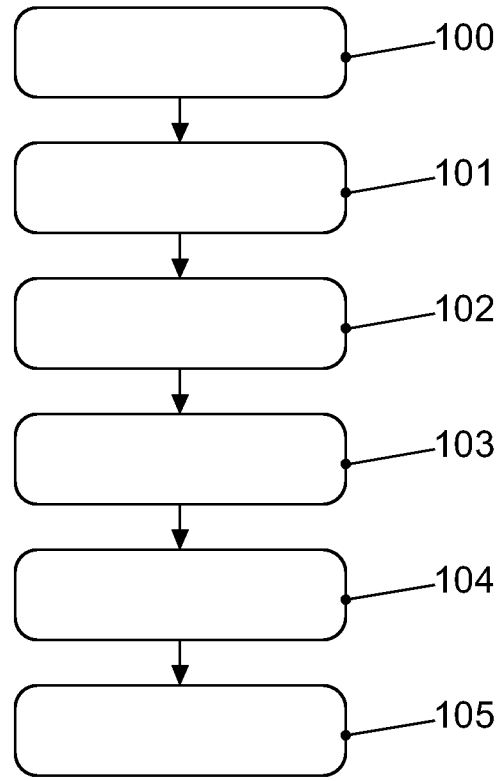
FIG. 3 shows a schematic flow chart of an embodiment of the method under some aspects of the present disclosure.

FIG. 3 shows a schematic flow chart of an embodiment of the method. In a method step 100, the apparatus or the measuring set-up is calibrated.

In a method step 101, a testing schedule is devised, which establishes a testing procedure. The testing schedule in particular encompasses a list of radio systems (such as mobile radio communication, WLAN, Bluetooth, GPS, radio, and the like), which are installed in the vehicle and must be tested. The testing schedule also defines a sequence in which the radio systems are to be tested. The testing schedule is devised, for example, by way of a control unit based on present vehicle features. The present vehicle features can be queried by a server from a database, for example, in which the respective vehicle features of a plurality of vehicles are stored.

In a method step 102, the individual radio systems are each tested individually. This takes place by determining the power parameters and checking antenna diversity and electromagnetic compatibility.

In a method step 103, the overall system formed of all radio systems installed in the vehicle is tested and checked accordingly.

In a method step 104, the power parameters of the individual radio systems as well as the antenna diversity and the electromagnetic compatibility are assessed based on predefined values.

Based on an assessment result, a report is prepared and provided and, for example, output in the form of a data sheet in a method step 105.

LIST OF REFERENCE NUMERALS 1 apparatus
2 rotatable platform
3 simulation antenna
4 base station emulator
5 testing antenna
6 testing unit
7 control unit
8 antenna
9 signal amplifier
10 attenuator
11 combiner
12 jamming antenna
13 further testing unit
14 amplifier apparatus
15 amplifier
16 switch
17 lossless duplexer
20 power parameter
21 compatibility check signal
22 antenna diversity check signal
23 report
30 network analyzer
40 testing chamber
50 vehicle
51 radio system
52 further radio system
$S_{x1}$ S-parameter
100-105 method steps

The invention claimed is:

1. An apparatus for determining power parameters of at least one radio system of a vehicle, comprising:
a rotatable platform for receiving and rotating the vehicle;
a simulation antenna comprising at least three antennas;
a base station emulator coupled to the simulation antenna;
at least one testing antenna, configured to receive signals from the at least one radio system at different rotation angles; and
at least one testing unit, connected to the at least one testing antenna and/or to the simulation antenna, the at least one testing unit being configured to determine at least one power parameter of the at least one radio system as a function of a rotation angle of the vehicle, based on signals received by the testing antenna and/or the simulation antenna, wherein the at least three antennas are arranged around a rotation axis of the rotatable platform to provide communication coverage with the at least one radio system across a full rotation of the vehicle, thereby minimizing signal shading caused by the vehicle's structure.

2. The apparatus of claim 1, wherein the at least one testing unit is configured to determine multiple power parameters of the at least one radio system simultaneously in a single measuring pass, the multiple power parameters including at least two of power spectral density, RF output power, sensitivity, spurious emission, radiated emission, or intermodulation.

3. The apparatus of claim 1, wherein the at least one testing unit is configured to determine at least one of the following power parameters of the radio system:
power spectral density, RF output power, sensitivity, spurious emission, radiated emission and/or intermodulation.

4. The apparatus of claim 1, further comprising at least one jamming antenna coupled to the at least one testing unit, wherein the at least one testing unit is configured to check electromagnetic compatibility of the at least one radio system, using the at least one jamming antenna.

5. The apparatus of claim 1, wherein the at least one testing unit is configured to check a functioning of an antenna diversity of the at least one radio system.

6. The apparatus of claim 1, wherein the base station emulator and the at least one testing unit are configured to determine power parameters of at least one further radio system configured in or on the vehicle.

7. The apparatus of claim 1, wherein the base station emulator and the at least one testing unit are configured to check a functioning of an antenna diversity of the at least one further radio system and/or an electromagnetic compatibility of at least one further radio system configured in or on the vehicle.

8. A method for determining power parameters of at least one radio system of a vehicle, comprising:
simulating a base station being via a base station emulator and a simulation antenna comprising at least three antennas;
receiving electromagnetic radiation at angular positions via the simulation antenna, wherein the at least three antennas are arranged around a rotation axis of a rotatable platform to provide substantially continuous communication coverage with the at least one radio system across a full rotation of the vehicle, thereby minimizing signal shading caused by the vehicle's structure; and
determining, via at least one testing unit coupled to at least one testing antenna, at least one power parameter of the at least one radio system as a function of a rotation angle of the vehicle.

9. The method of claim 8, further comprising determining, via the at least one testing unit, multiple power parameters of the at least one radio system simultaneously in a single measuring pass, the multiple power parameters including at least two of power spectral density, RF output power, sensitivity, spurious emission, radiated emission, or intermodulation.

10. The method of claim 8, wherein determining at least one power parameter comprises determining at least one of: power spectral density, RF output power, sensitivity, spurious emission, radiated emission and/or intermodulation.

11. The method of claim 8, further comprising checking electromagnetic compatibility of the at least one radio system via the at least one testing unit, using at least one jamming antenna coupled to the at least one testing unit.

12. The method of claim 8, further comprising checking a functioning of an antenna diversity of the at least one radio system via the at least one testing unit.

13. The method of claim 8, further comprising determining power parameters of at least one further radio system of the vehicle.

14. The method of claim 8, further comprising checking (i) a functioning of an antenna diversity of the at least one further radio system and/or (ii) an electromagnetic compatibility of the at least one further radio system.

15. An apparatus for determining power parameters of at least one radio system of a vehicle, comprising:
a rotatable platform for receiving and rotating the vehicle;
a simulation antenna comprising at least three antennas;
a base station emulator coupled to the simulation antenna;
at least one testing antenna configured to detect electromagnetic radiation from the at least one radio system; and
at least one testing unit, connected to the at least one testing antenna and/or to the simulation antenna, the at least one testing unit being configured to determine at least one power parameter of the at least one radio system as a function of a rotation angle of the vehicle,
wherein the at least three antennas are arranged around a rotation axis of the rotatable platform to provide communication coverage with the at least one radio system across a full rotation of the vehicle, thereby minimizing signal shading caused by the vehicle's structure.

16. The apparatus of claim 15, wherein the at least one testing unit is configured to determine at least one of the following power parameters of the at least one radio system in a single measuring pass, the multiple power parameters comprising: power spectral density, RF output power, sensitivity, spurious emission, radiated emission and/or intermodulation.

17. The apparatus of claim 15, further comprising at least one jamming antenna coupled to the at least one testing unit, wherein the at least one testing unit is configured to check electromagnetic compatibility of the at least one radio system, using the at least one jamming antenna.

18. The apparatus of claim 15, wherein the at least one testing unit is configured to check a functioning of an antenna diversity of the at least one radio system.

19. The apparatus of claim 15, wherein the base station emulator and the at least one testing unit are configured to determine power parameters of at least one further radio system configured in or on the vehicle.

20. The apparatus of claim 15, wherein the base station emulator and the at least one testing unit are configured to check a functioning of an antenna diversity of the at least one further radio system and/or an electromagnetic compatibility of at least one further radio system configured in or on the vehicle.

* * * * *